United States Patent
Yu

(10) Patent No.: US 8,582,048 B2
(45) Date of Patent: Nov. 12, 2013

(54) LED BACKLIGHT MODULE AND LIQUID CRYSTAL DISPLAY DEVICE USING THE SAME

(75) Inventor: Gang Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 121 days.

(21) Appl. No.: 13/258,644

(22) PCT Filed: Aug. 26, 2011

(86) PCT No.: PCT/CN2011/079007
§ 371 (c)(1),
(2), (4) Date: Sep. 22, 2011

(87) PCT Pub. No.: WO2013/023387
PCT Pub. Date: Feb. 21, 2013

(65) Prior Publication Data
US 2013/0044275 A1    Feb. 21, 2013

(30) Foreign Application Priority Data
Aug. 18, 2011  (CN) .................. 2011 2 0301270 U

(51) Int. Cl.
*G02F 1/1333*  (2006.01)
*G06F 1/16*  (2006.01)

(52) U.S. Cl.
USPC ................................ 349/58; 349/62; 362/97.1

(58) Field of Classification Search
USPC .......... 349/56, 60, 62, 57, 58; 362/97.1, 97.2, 362/97.3
See application file for complete search history.

(56) References Cited

U.S. PATENT DOCUMENTS

| | | | | |
|---|---|---|---|---|
| 4,511,760 A * | 4/1985 | Garwin et al. | ............. | 178/18.03 |
| 6,879,318 B1 * | 4/2005 | Chan et al. | .................... | 345/173 |
| 7,377,682 B2 * | 5/2008 | Chang et al. | .................. | 362/633 |
| 8,144,453 B2 * | 3/2012 | Brown et al. | ............ | 361/679.21 |
| 2006/0126362 A1 * | 6/2006 | Hsieh et al. | .................... | 362/633 |
| 2013/0044275 A1 * | 2/2013 | Yu | .................................. | 349/62 |

FOREIGN PATENT DOCUMENTS

| | | |
|---|---|---|
| CN | 1372160 A | 10/2002 |
| CN | 101392895 A | 3/2009 |
| CN | 101539682 A | 9/2009 |
| CN | 201359237 Y | 12/2009 |
| CN | 101818874 A | 9/2010 |

OTHER PUBLICATIONS

Chen Yajuan, the International Searching Authority written comments, May 2012, CN.

* cited by examiner

*Primary Examiner* — Eric Wong
(74) *Attorney, Agent, or Firm* — IPro, Inc.; Na Xu

(57) ABSTRACT

The present invention discloses a LED backlight module and a LCD device using the same, and the backlight module comprises a backplane and a light guide plate, wherein the edge of said light guide plate is fixed on the backplane by elastic part(s). Because the present invention uses the elastic parts to connect the light guide plate with the backplane, uses the elasticity of the elastic parts to fix the light guide plate in the backlight cavity and align the light guide plate with the LED. Thus, the thinner rubber frame designed for thinning is not used for compressing the light guide plate any longer, the backlight module is thinner, and the positioning of the light guide plate is more reliable.

8 Claims, 2 Drawing Sheets

LED BACKLIGHT MODULE AND LIQUID CRYSTAL DISPLAY DEVICE USING THE SAME

TECHNICAL FIELD

The present invention relates to the field of liquid crystal display (LCD) devices, particularly to a backlight module and a LCD using the same.

BACKGROUND

The edge-lit LED backlight modules are usually used in the current existing LCD devices. Based on consideration of weight and trend of reduction of thickness, the thickness of the light guide plate is usually designed to be the same as the width of the LED. The method often used in the current design is to compress the light guide plate by the rubber frame, to achieve the aim that the light guide plate is aligned with the LED.

FIG. 1 shows the mode of positioning of the light guide plate of the currently used backlight module. Said backlight module comprises a LED 110, a LED packaging substrate 120, a light bar bracket 130, a rubber frame 200, a backplane 300 and a light guide plate 400, wherein the LED 110, the LED packaging substrate 120, the light bar bracket 130 are respectively fixed on the backplane 300; the light guide plate is arranged in the position corresponding to the LED 110; and the rubber frame 200 is a thin plate arranged outside the backlight cavity; one part of the rubber frame 200 which is in parallel with the light guide plate 400 is provided with a lug boss 210 on the side facing the light guide plate; the light guide plate 400 is compressed and fixed by the lug boss 210 so that the light guide plate is aligned with the LED 110; and the alignment here means that the light incident surface of the light guide plate 400 can completely coincide with the light emergent surface of the LED 110. However, with the process of reduction of thickness of the LCD devices, the thickness of the rubber frame 200 becomes thinner and thinner, and as a result the compressing force provided by the lug boss 210 is limited. If the rubber frame is still used for compressing the light guide plate for positioning, the positioning reliability will be reduced, and the trend of reduction of thickness will be affected.

SUMMARY

One aim of the present invention is to provide a thinner LED backlight module and a LCD device thereof with a reliably positioned light guide plate.

The other aim of the present invention is to preferably align the light guide plate with the LED, and decrease the damage to the rubber frame by an act of external force.

The aim of the LED backlight module of the present invention is achieved by the following technical schemes. A LED backlight module comprises a backplane and a light guide plate, wherein the edge of said light guide plate is fixed on the backplane by one or more elastic parts.

Preferably, multiple elastic parts are arranged, and said elastic parts are fixed at one end of said light guide plate and are respectively arranged at the edges of said light guide plate in pairs by using the center of the light guide plate as a symmetric center. Thus, the whole light guide plate is symmetrically stressed, and very little position offset will occur.

Preferably, said elastic parts are arranged on the four corners of said light guide plate. Such design makes the light guide plate be symmetrically stressed and the coverage area of the stressing points be wide.

Preferably, each said elastic part is a spring; one end of said spring is fixed at the edge of said light guide plate, and the other end of the spring is fixed on said backplane. The light guide plate and the backplane are held by the elastic parts so that the light guide plate is fixed and the fixed alignment effect is better, and the damage to the rubber frame by an act of external force can be decreased.

Preferably, each edge of said light guide plate is provided with a hole, and one end of each said spring is hung in the hole of said light guide plate. This embodiment may be implemented with convenience. The hole is easy to process and can provide a hanging point. The spring is hung in the hole of the light guide plate along the outer edge of the light guide plate, to provide vertical pulling force for the light guide plate in the backplane direction and to provide planar horizontal force symmetrically for the light guide plate, so that the light guide plate can be preferably aligned with the LED.

Preferably, the backplane is provided with one or more clamping hooks; the other end of each said spring is hung on the clamping hook of said backplane. It is a convenient and reliable fixing mode by fixing the spring through the clamping hook.

Preferably, each said spring is in a cylindrical or conical shape. The cylindrical springs are frequently used. The conical springs reduce the compression of the side of the light guide plate to the springs.

Preferably, the side surface at the edge of said light guide plate facing the backplane is provided with one or more indentations, and one end of said spring is fixed in the indentation of said light guide plate, and the other end of the spring is fixed in the position of the backplane corresponding to the indentation. The light guide plate is vertically held by the pulling force provided by the spring for the light guide plate in the backplane direction through the indentation, so that the spring will not occupy much space and the indentation is easy to process.

Preferably, the backlight panel is provided with one or more bended clips, and the other end of said spring is clamped in the bended clip of the backlight panel. The spring is conveniently and quickly fixed by the bended clip as an additional mode for fixing of the spring to the backplane.

The aim of the LCD device of the present invention is achieved by the following technical schemes. A LCD device comprises the above backlight module.

The light guide plate is connected with the backplane by the elastic parts, so that the light guide plate is fixed in the backlight cavity. Thus, the relatively thin rubber frame is not required to be used for compressing the light guide plate any longer. The aim that the light guide plate is aligned with the LED is preferably achieved. The problem of unreliable compression because of the thin rubber frame is solved. The backlight module and the LCD are allowed to be made into even thinner shape.

Wherein, 110. LED, 120. LED packaging substrate, 130. light bar bracket, 200. rubber frame, 210. lug boss, 300. backplane, 301. clamping hook, 302. bended clip, 400. light guide plate, 401. hole, 402. indentation and 500 spring.

DETAILED DESCRIPTION

The present invention will further be described in detail in accordance with the figures and the preferred embodiments.

Figure 1:
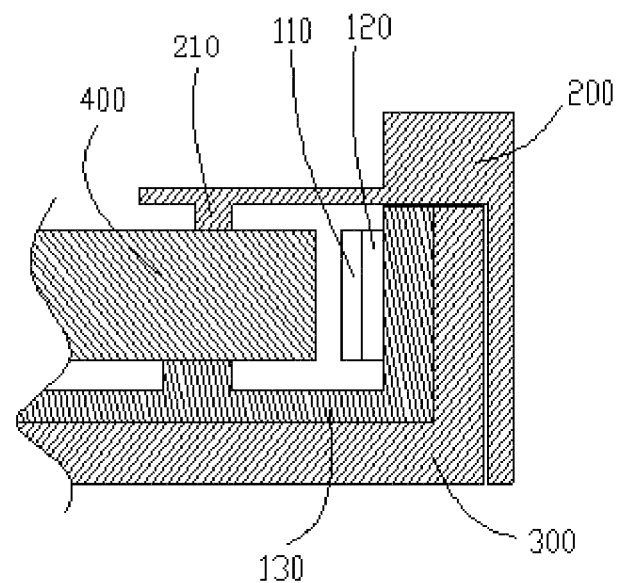
FIG. 1 is the sectional schematic diagram of the backlight module in the prior art.
Figure 2:
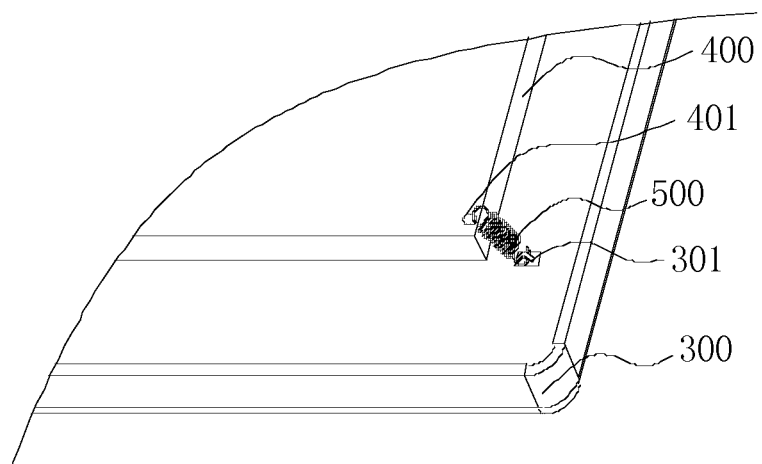
FIG. 2 is the partial schematic diagram of the backlight module of a first embodiment of the present invention.
Figure 3:
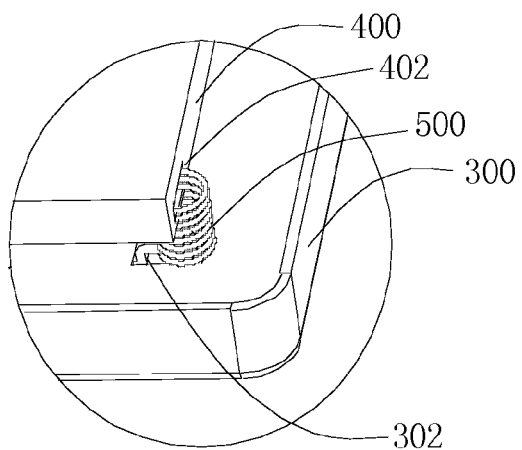
FIG. 3 is the partial schematic diagram of the backlight module of a second embodiment of the present invention.
Figure 4:
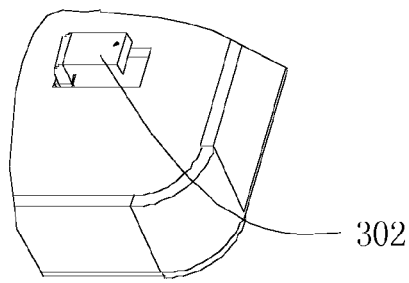
FIG. 4 is the partial schematic diagram of the backlight panel of a second embodiment of the present invention.

The structures of the backlight module of said LCD device in the embodiments of the present invention are shown in FIG. 2 to FIG. 4, and only some of the components of the backlight module are shown in the figures. The backlight module comprises a LED (not shown in the figure) which is fixed in the backlight cavity, a light guide plate 400 and a backplane 300, wherein the light guide plate 400 is connected with the backplane 300 by each spring 500, and the light guide plate 400 is held by each spring 500 which is in the stretching state so that the light guide plate 400 is fixed in the backlight cavity and is aligned with the LED.

FIG. 2 shows a preferred embodiment of the present invention. The light guide plate 400 is connected with a connection point of the backplane 300 by a cylindrical spring 500, and both ends of the spring 500 are respectively provided with a hook, wherein the spring 500 can be in conical or elliptical shape to reduce the compression between the edge of the spring and the edge of the light guide plate. The corner of the upper surface of the light guide plate 400 is provided with a hole 401, and the hole is used for providing a hooking point for one hook of the spring 500. As shown in FIG. 2, the hole 401 can be a through hole as well as a blind hole. In addition, the hole can be arranged in not only the upper surface, but also the side surface so long as a hooking point can be provided to one hook of the spring 500. The backplane 300 is correspondingly provided with clamping hooks 301, the clamping hook 301 is arranged on the outer side of the light guide plate 400 which is perpendicular to the projection of the backplane 300. The hooks at both ends of the spring 500 are respectively hung on the clamping hook 301 of the backplane 300 and in the hole 401 of the light guide plate 400 along the outer edge of said light guide plate, so that the spring 500 is in the oblique pulling state. The embodiment is convenient to implement. The spring is hung in the hole of the light guide plate along the outer edge of the light guide plate, to provide vertical pulling force for the light guide plate in the backplane direction and symmetrically provide the planar horizontal force for the light guide plate, so that the light guide plate can be preferably aligned with the LED.

FIG. 3 shows a second preferred embodiment of the present invention. As shown in the figure, the light guide plate 400 is connected with a connection point of the backplane 300 by a cylindrical spring 500. The side surface at the edge of said light guide plate facing the backplane is provided with indentations 402. One end of said spring 500 is fixed in the indentation 402, and the depth of the indentation 402 penetrating in the light guide plate is preferably more than the radius of the spring 500. Thus, most part of the spring 500 can be clamped in the indentation 402 to preferably ensure that the spring 500 can not pop out. The position of the backplane 300 corresponding to the indentation 402 is provided with bended clips 302 (as shown in FIG. 4). The length of the part of the bended clip 302 clamped in the spring is long enough, to ensure that the spring can be clamped in the bended clip and can not pop out. Thus, the light guide plate 400 and the backplane 300 are vertically held by the spring 500 through the indentation 402 arranged in the light guide plate 400 and the bended clip arranged on the backplane 300. The light guide plate is vertically held by the pulling force provided by the spring for the light guide plate in the backplane direction, so that the light guide plate 400 is preferably fixed in the backlight cavity and is aligned with the LED. The spring can not occupy much space, and the bended clip and the indentation is easy to process.

Figure 5:
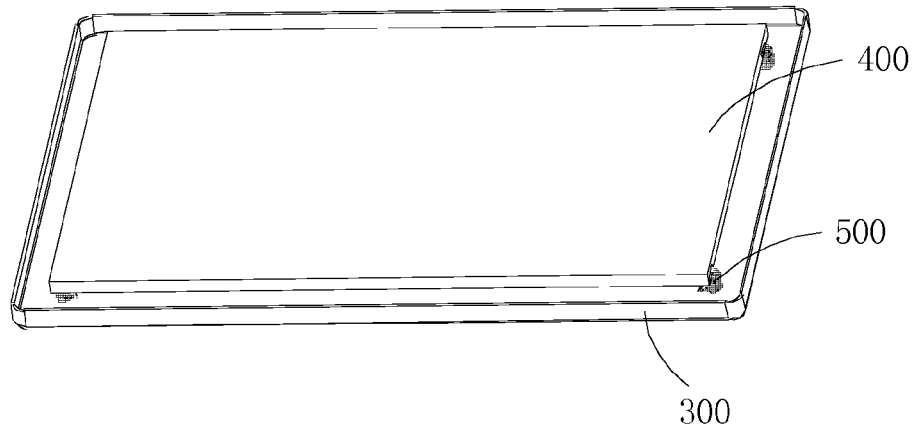
FIG. 5 is the schematic diagram of the backlight module of a second embodiment of the present invention.

The above scheme is the specific mode of fixing of the light guide plate 400 and one connection point of the backplane 300. As shown in FIG. 5, the light guide plate 400 together with the backplane 300 are respectively provided with four connection points which are respectively positioned on the four corners of the light guide plate 400 and are symmetrical corresponding to the center of the light guide plate. Thus, the light guide plate 400 is uniformly stressed and then is preferably aligned with the LED, and the position offset is avoided. Its structure is more simple and reliable. The light guide plate 400 is fixed in the backlight cavity under the pulling force of the four springs 500. Thus, the rubber frame used for compressing and positioning the light guide plate is omitted, so that the backlight module can be thinner, and the problem of unreliable compression by the rubber frame can be solved.

Of course, the connection points can be in other positions of the edges of the light guide plate 400, so long as the light guide plate can be fixed. It is preferable to have multiple connection points. Particularly, the springs in pairs can be arranged at the edges of said light guide plate in pairs by using the center of the light guide plate as a symmetric center, so that the light guide plate 400 is uniformly stressed.

In addition to using the springs 500 to tighten the light guide plate 400, other elastic parts such as elastic rubbers, etc. can also be used. In addition, each hole or groove in the light guide plate 400 has the function for providing a hanging point or a fixing point so that one end of the spring 500 or other elastic part can be fixed on the light guide plate. Similarly, each clamping hook and each bended clip of the backplane 300 also have the same function, and other changes to these structures should belong to the protection scope of the present invention.

The present invention is described in detail in accordance with the above contents with the specific preferred embodiments. However, this invention is not limited to the specific embodiments. For the ordinary technical personnel of the technical field of the present invention, on the premise of keeping the conception of the present invention, the technical personnel can also make simple deductions or replacements, and all of which should be considered to belong to the protection scope of the present invention.

I claim:

1. A LED backlight module, comprising:
a backplane and a light guide plate; the edges of said light guide plate are fixed on the backplane by one or more elastic parts;
wherein multiple elastic parts are arranged, and said elastic parts are fixed at one end of said light guide plate and are arranged at the edges of said light guide plate in pairs by using the center of the light guide plate as a symmetric center;
wherein each said elastic part is a spring; one end of said spring is fixed at the edge of said light guide plate, and the other end of the spring is fixed on said backplane;
wherein each said spring is cylindrical; and
wherein the surface at the edge of said light guide plate facing the backplane is provided with one or more indentations, one end of said spring is clamped in the indentation of said light guide plate with at least a ring of the spring clamped in the indentation, and the other end of the spring is fixed in the position of the backplane corresponding to the indentation.

2. The LED backlight module of claim 1, wherein said elastic parts are arranged on the four corners of said light guide plate.

3. The LED backlight module of claim 1, wherein said backlight panel is provided with one or more bended clips, the other end of said spring is clamped in the bended clip of said backlight panel without popping out, and a free end of the bended clip is sandwiched between two adjacent rings of the spring.

4. A LCD device, comprising: a backplane and a light guide plate, the edges of said light guide plate are fixed on said backplane by elastic parts;

wherein multiple elastic parts are arranged, and said elastic parts are fixed at one end of said light guide plate and are arranged at the edges of said light guide plate in pairs by using the center of the light guide plate as a symmetric center;

wherein each said elastic part is a spring; one end of said spring is fixed at the edge of said light guide plate, and the other end of the spring is fixed on said backplane;

wherein each said spring is cylindrical; and wherein the surface at the edge of said light guide plate facing the backplane is provided with one or more indentations, one end of said spring is clamped in the indentation of said light guide plate with at least a ring of the spring clamped in the indentation, and the other end of the spring is fixed in the position of the backplane corresponding to the indentation.

5. The LCD device of claim 4, wherein said elastic parts are arranged on the four corners of said light guide plate.

6. The LCD device of claim 4, wherein said backlight panel is provided with one or more bended clips, and the other end of said spring is clamped in the bended clip of said backlight panel without popping out.

7. The LED backlight module of claim 1, wherein a depth of each indentation is more than a radius of the rings of the spring; most part of the one end of said spring is clamped in the indentation of said light guide plate.

8. The LCD device of claim 4, wherein a depth of each indentation is more than a radius of the rings of spring; most part of the one end of said spring is clamped in the indentation of said light guide plate.

* * * * *